US 7,136,909 B2

(12) United States Patent
Balasuriya (10) Patent No.: US 7,136,909 B2
(45) Date of Patent: Nov. 14, 2006

(54) MULTIMODAL COMMUNICATION METHOD AND APPARATUS WITH MULTIMODAL PROFILE

(75) Inventor: Senaka Balasuriya, Westmont, IL (US)

(73) Assignee: Motorola, Inc., Schaumburg, IL (US)

( * ) Notice: Subject to any disclaimer, the term of this patent is extended or adjusted under 35 U.S.C. 154(b) by 824 days.

(21) Appl. No.: 10/034,572

(22) Filed: Dec. 28, 2001

(65) Prior Publication Data

US 2003/0126330 A1    Jul. 3, 2003

(51) Int. Cl.
*G06F 15/177* (2006.01)
*G06F 3/00* (2006.01)

(52) U.S. Cl. ............... 709/220; 715/747; 710/14
(58) Field of Classification Search .......... 709/203, 709/220, 228, 221; 715/744–747; 710/8, 710/14; 379/907; 704/275
See application file for complete search history.

(56) References Cited

U.S. PATENT DOCUMENTS

| 5,479,476 | A | * | 12/1995 | Finke-Anlauff ............. 455/566 |
| 5,918,222 | A | * | 6/1999 | Fukui et al. ................... 707/1 |
| 5,983,186 | A | * | 11/1999 | Miyazawa et al. .......... 704/275 |
| 6,018,711 | A | | 1/2000 | French-St. George et al. |
| 6,104,712 | A | | 8/2000 | Robert et al. |
| 6,199,045 | B1 | | 3/2001 | Giniger et al. |
| 6,249,808 | B1 | | 6/2001 | Seshadri |
| 6,285,891 | B1 | * | 9/2001 | Hoshino ..................... 455/567 |
| 6,377,913 | B1 | * | 4/2002 | Coffman et al. ............... 704/8 |
| 6,405,040 | B1 | | 6/2002 | Liu et al. |
| 6,829,603 | B1 | * | 12/2004 | Chai et al. ..................... 707/10 |
| 2001/0047263 | A1 | * | 11/2001 | Smith et al. ................ 704/275 |
| 2002/0059425 | A1 | * | 5/2002 | Belfiore et al. ............. 709/203 |
| 2002/0152255 | A1 | * | 10/2002 | Smith et al. ................. 709/102 |

OTHER PUBLICATIONS

U.S. Appl. No. 60/213,562, filed May 2000, Belfiore et al.*
W3C, Hickey, Marianne (editor) "Multimodal Requirements for Voice Markup Languages" Jul. 10, 2000, W3C Working Draft available www.w3.org/TR/multimodal-reqs.*
PCT Search Report, Apr. 16, 2003.
Klyne, G., "A Syntax for Describing Media Feature Sets," Network Group Request for Comments: 2533, Category: Standards Track, Copyright The Internet Society (1999), pp. 1-35.
Maes, Stephane H., "Multi-modal Web IBM Position," W3C/WAP Workshop, IBM Human Language Technologies, pp. 1-9.

* cited by examiner

*Primary Examiner*—Saleh Najjar
*Assistant Examiner*—David Lazaro
(74) *Attorney, Agent, or Firm*—Vedder, Price, Kaufman & Kammholz, P.C.

(57) ABSTRACT

A multimodal communication system and method creates and accesses a multimodal profile (114) that contains at least multimodal preference information (202), such as desired input modality and a desired output modality for a given multimodal communication session. The multimodal profile (114) may also include at least one identifier (204) associated with the multimodal preference information (202). A multimodal communication apparatus (102) includes a multimodal profile generator (110) that accesses and/or generates a multimodal profile (114). A multimodal communication apparatus configuration controller (112) which is operatively responsive to the accessed multimodal preference information (124) from a given user profile, configures the multimodal communication apparatus (102) and/or a network element for the multimodal communication session based on the accessed multimodal preference information (124) in the multimodal profile.

18 Claims, 4 Drawing Sheets

MULTIMODAL COMMUNICATION METHOD AND APPARATUS WITH MULTIMODAL PROFILE

FIELD OF THE INVENTION

The invention relates generally to communication methods and apparatus and more specifically to multimodal communication methods and apparatus.

BACKGROUND OF THE INVENTION

An emerging area of technology involving communication devices, also known as terminal devices, such as handheld devices, mobile phones, laptops, PDAs, internet appliances, non-mobile devices or other suitable device, is the application of multi-modal interactions for access to information and services. Typically resident on the terminal device is at least one browser, wherein the browser is an application or other mechanism which responds to fetch requests (entered by a user through an interface or from another device or application), receive fetched information, navigate through content servers via internal, e.g. intranet, or external, e.g. internet, connections, and present information to the user. The browser may be a graphical browser, voice browser, or any other suitable browser as recognized by one of ordinary skill in the art. Such browser may include but are not limited to J2ME applications, Java applications or any suitable mechanism.

Multi-modal technology allows a user to access information, such as voice, data, encrypted information, video, audio or other information, and services such as email, weather updates, bank transactions, and news through one or more browsers. More specifically, the user may submit an information fetch request in one or more modalities, such as speaking a fetch request into a microphone, and the user may then receive the fetched information in the first or a second mode, such as viewing the information on a display screen. Within the terminal device, the browser works in a manner similar to a standard web browser or other suitable application resident on a computer connected to a network or to other terminal devices.

As such, multimodal communication systems are being proposed that may allow users to utilize one or more input and output interfaces to facilitate communication in a plurality of modalities on a per session basis. For example, a user may wish to use a different modality in different circumstances. For example it may be desirable to input a request via a tactile interface on a communication device, such as a portable or non-portable device such as desktop units, hand held Internet appliances, mobile telephones, PDAs or any other suitable device in the form of text and receive retrieved information in an audio format such as voice. Specifying such input and output modality preferences each time a user is in a communication session can be time consuming and potentially complicated.

In addition, user profiles are known, such as stored software files, that may contain user information such as a user's preferences for a software application, contact information and, for example, a communication device's capabilities, such as whether or not the communication device can encrypt or decrypt information, and other capabilities. However, no user profiles are known which deal with multimodal communication systems.

Accordingly, a need exists for a multimodal apparatus and method that facilitates customization of input and output interface selection along with other desired multimodal preferences.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENT

Briefly, a multimodal communication system and method creates and accesses a multimodal profile that contains at least multimodal preference information, such as desired input modality and a desired output modality for a given communication apparatus. The multimodal profile also includes at least one identifier associated with the multimodal preference information or multi-modal preference information for a given scenario without an identifier. When used, the identifier may identify, for example, an environmental situation that a user may encounter, such as the user being in a meeting, in a vehicle other environment, or other utilizing a specific service. For example, a multimodal profile is customizable and may dictate that the multimodal communication apparatus use voice as the mechanism for inputting information and uses voice for outputting information when the multimodal communication device is in a car, but another set of multimodal preference information for a given user profile may dictate that the communication apparatus use a tactile interface for receiving input from a user and provide a visual interface for outputting of information on the communication device. Accordingly, the multimodal communication method and apparatus configures at least one multimodal communication apparatus for a multimodal communication session based on the accessed multimodal preference information from the multimodal profile.

In one example, a multimodal communication apparatus includes a multimodal profile generator that accesses and/or generates a multimodal profile. A multimodal communication apparatus configuration controller which is operatively responsive to the accessed multimodal preference information from a given user profile, configures the multimodal communication apparatus for the multimodal communication session based on the accessed multimodal preference information in the user profile. If desired, a multimodal profile may be created for a given user, a given communication device, a given software application running on the multimodal communication apparatus, a set of users that may use the multimodal communication apparatus, or any other suitable criteria.

In one embodiment, the multimodal communication apparatus and method creates a multimodal profile by presenting a user interface to a user, that is adapted to receive input and output modality preference data to define differing multimodal preference information for a plurality of multimodal communication scenarios. Each of the multimodal communication scenarios is associated with an identifier. For example, one multimodal communication scenario may be, as noted above, that the user and device are located in a vehicle and hence text output may not be desirable. Another multimodal communication scenario may be that the user and communication apparatus is present in a meeting so that audio output may not be desirable to avoid interruption of dialog occurring during the meeting. The method and apparatus also stores received input and output modality preference data and associates the identifier to the designated input and output modality preference data. This may be done, for example, through an object oriented database or any other suitable linking mechanism.

In one embodiment, the multimodal profile is stored on the multimodal communication apparatus. In another embodiment, the multimodal profile is stored in a multimodal network element wherein the multimodal network element includes multimodal profiles for a plurality of different communication apparatus and/or for a plurality of different users.

In another embodiment, a multimodal communication apparatus includes an ambient condition sensor, such as a noise level sensor, to detect an ambient condition level. The ambient condition level is then compared to an ambient condition threshold stored in the multimodal profile and an appropriate multimodal input and output setting for the multimodal communication apparatus is selected based on the comparison.

By having the multimodal profile programmable and hence customizable, a user may specify the modality preferences once for a given situation and reuse the same settings. A user need not input and select various modality preferences on a per session basis. Other advantages will be recognized by those of ordinary skill in the art. A user may invoke and manage a multimodal session using the profile through many different mechanisms, such as dragging and dropping a profile icon on an application or into a browser to set up a multimodal session. The user may select the profile from a menu, bookmark or URL, or simply by invoking a service that requires parameters found in a given profile.

Figure 1:
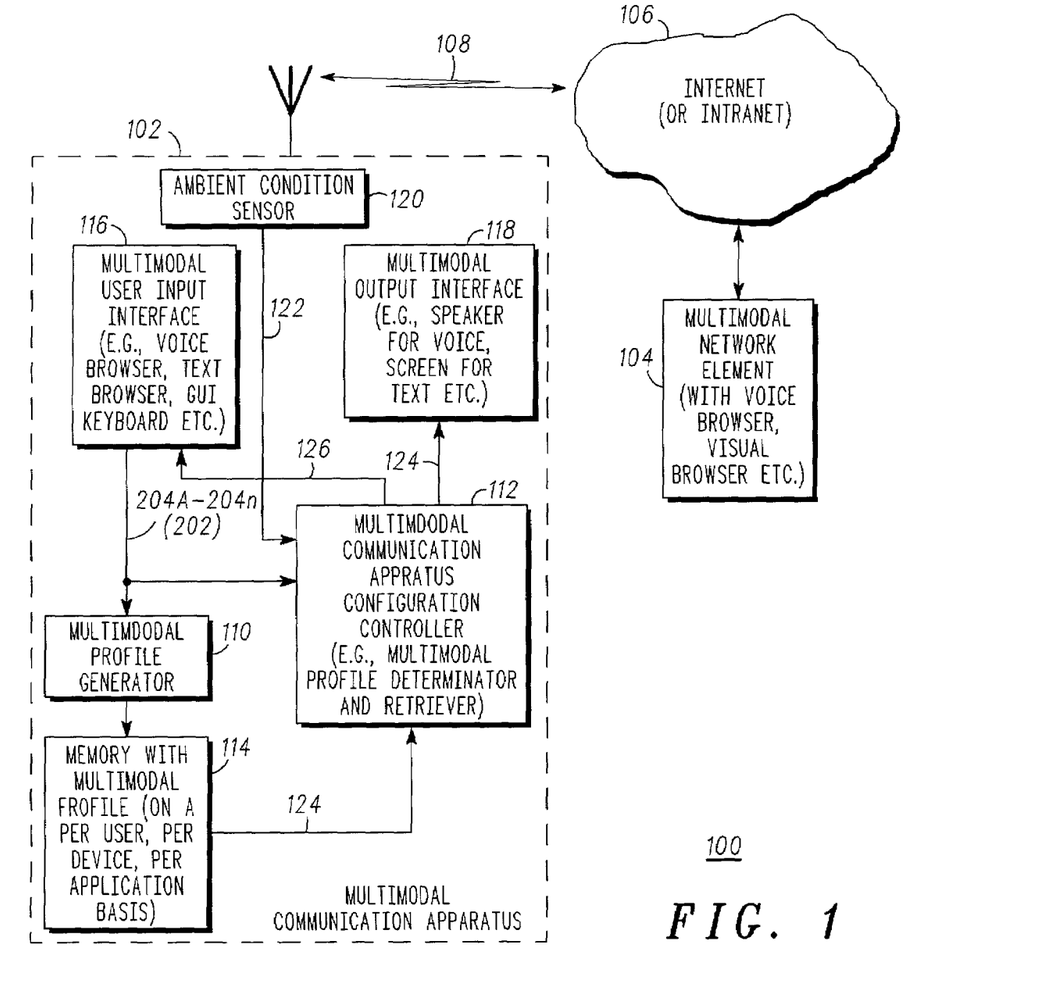
FIG. 1 is a block diagram illustrating one example of a multimodal communication system in accordance with one embodiment of the invention.

FIG. 1 illustrates one example of a multimodal communication system 100 that includes a multimodal communication apparatus 102 and a multimodal network element 104 operatively coupled to one another through a network connection such as the internet 106, an intranet link, or any other suitable link. For purposes of illustration only, and not limitation, the multimodal communication apparatus 102 will be described as having a wireless communication transceiver to communicate via a wireless link 108 with the multimodal network element 104. However, it will be recognized that the multimodal communication apparatus 102 can be any suitable device whether wireless, non-wireless, mobile or non-mobile. The profile can also be a part of the multi-modal network element or otherwise reside on a network. In such an embodiment, the network element may be accessible over a communication link or the network element can be synchronized with a multi-modal communication apparatus.

The multimodal communication apparatus 102 includes a multimodal profile generator 110, a multimodal communication apparatus configuration controller 112, memory with multimodal profiles 114, a multimodal user input interface 116, a multimodal output interface 118 and an ambient condition sensor 120 if desired. The ambient condition sensor 120 or other mechanism can be used to determine if a user is "in meeting" (no audio in/out), "in vehicle" (no tactile input), "in public transportation" (have tactile input and no audio out, etc., "at desktop" (all modalities on), etc.

By way of example, and not limitation, the multimodal profile generator 110 may be a software algorithm executing on a digital signal processor, microprocessor or any other suitable processor or it may be discrete logic circuitry, state machine or any other suitable structure. Similarly, the multimodal communication apparatus configuration controller 112 may also be a software algorithm executing on a processing device such as a DSP, CPU, or it may be implemented via discrete logic, state machine, or any other suitable structure. The memory may be any suitable random access memory, distributed memory, removable memory device, or any other suitable memory that can store the information for the multimodal profile as further described herein.

The multimodal user input interface 116 may be, for example, a voice browser, text browser, keyboard, or other graphic user interface on a screen, or any other suitable multimodal input interface. Likewise, the multimodal output interface 118 may be a screen that outputs text through a text browser, may be a speaker system that outputs voice through, for example, a voice browser, may be a vibration mechanism or any other type of visual or audio output mechanism.

The multimodal network element 104 may be any suitable network element that includes, for example, a voice browser, a graphical browser or any other suitable input/output interface to facilitate multimodal communication with the multimodal communication apparatus. It will be recognized that although the multimodal communication system 100 is shown as including a network, the invention is equally applicable to a plurality of multimodal communication apparatus that are linked to each other and not linked through a network.

Figure 2:
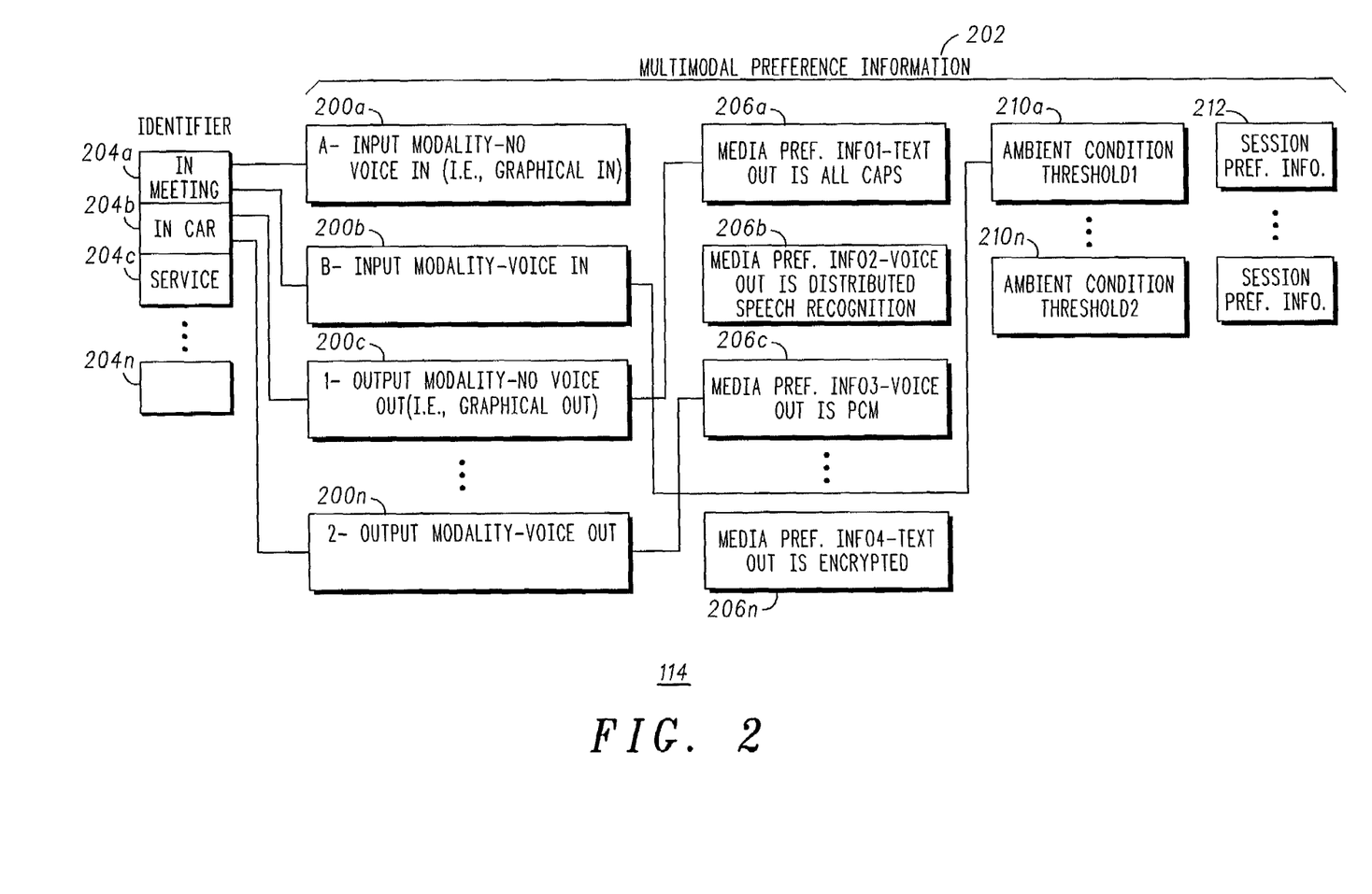
FIG. 2 is a diagram illustrating one example of multimodal profiles in accordance with one embodiment of the invention.
Figure 3:
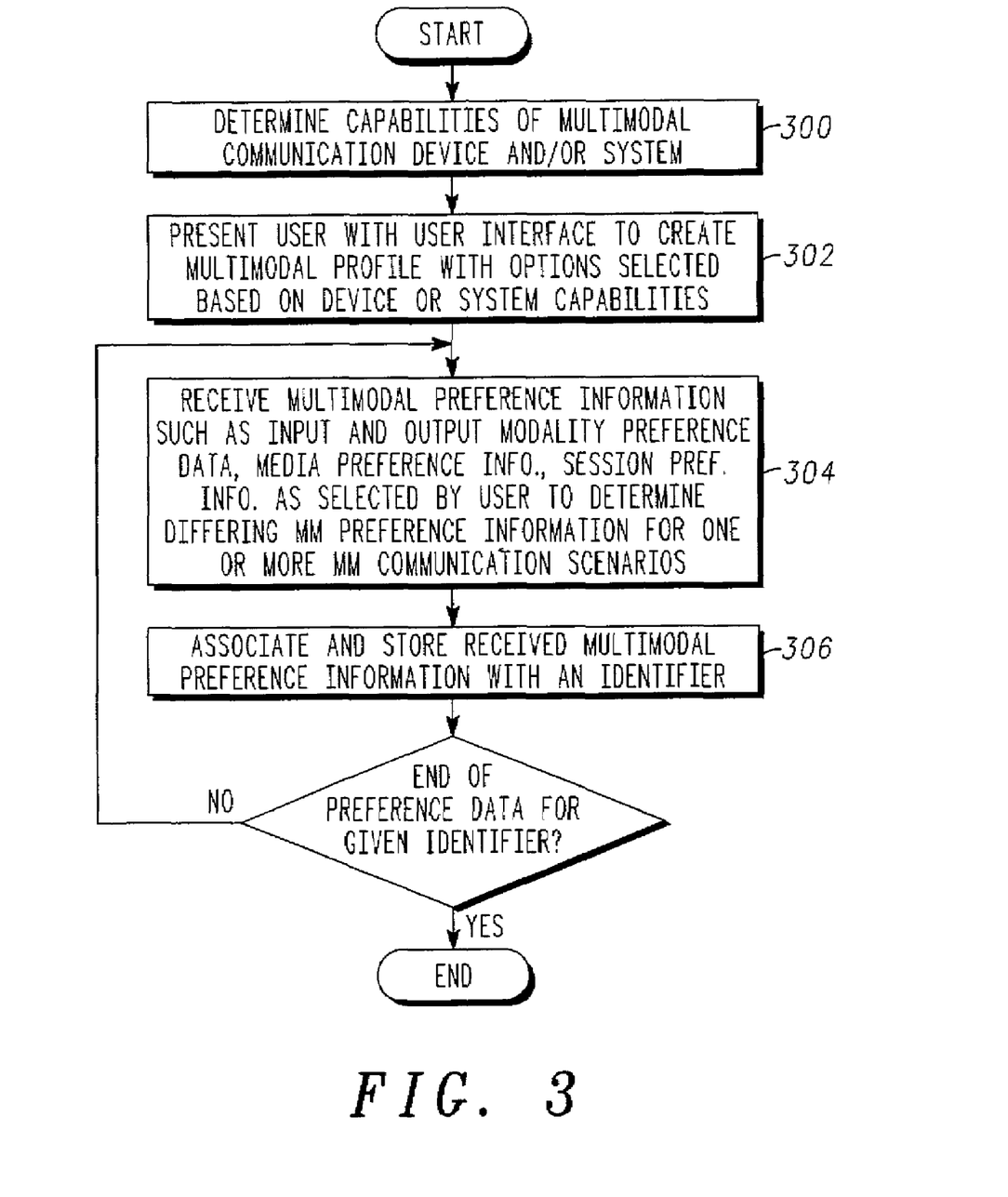
FIG. 3 is a flow chart illustrating one example of a multimodal communication method in accordance with one embodiment of the invention.

Referring to FIGS. 2 and 3, one example of the operation of the multimodal communication apparatus 102 will be described. To create a multimodal profile 114, a CPU or other suitable device determines the capabilities of the multimodal communication device 102 through operating system queries or other suitable technique, as shown in block 300 (see FIG. 3). By way of example, and not limitation, device capabilities may include, for example, whether the multimodal communication apparatus has or is communicatively coupled with a text browser, voice browser, speech recognition engine, handwriting recognition engine, gesture recognition engine, and the like, ambient condition sensors or any other suitable capabilities necessary to determine a suitable multimodal input/output configuration for a given session or activity.

As shown in block 302, the method of multimodal communication includes presenting a multimodal user interface to a user to create the multimodal profile 114. This includes, for example, providing a graphic user interface or other suitable interface with user options that are selectable. This may include, for example, a voice activated interface. The user interface that is presented may be based on the device capabilities. However, the selectable options for a profile are preferably based on the capabilities determined in step 300 For example, if the multimodal communication apparatus 102 does not include an ambient condition sensor 120, the user interface that is presented to the user will not include options to select ambient condition thresholds since no ambient condition levels can be sensed.

As shown in block 304, the method includes receiving, via the user interface, input and output modality preference data 200a–200n that defines different multimodal preference information 202 for different multimodal communication scenarios. The multimodal preference information 202 may include, for example, media preference information (e.g. such as whether output text is in all caps, whether voice out is in pulse code modulated (PCM) format, whether output text is encrypted or other suitable variables), session preference information (e.g., network control information), ambient condition levels, or any other desired preference information. Accordingly, an identifier 204a–204n is associated, via, for example, an object oriented database, with corresponding multimodal preference information 202. the identifiers 204a–204n, in this example, correspond to different multimodal communication scenarios. For example, identifier 204a corresponds to an "in meeting" communication scenario where, for example, a given user may be participating in a meeting in a meeting room. By way of another example, communication scenario indicated by identifier 204b is an "in car" communication scenario defined such that the multimodal communication apparatus and user are located in a car or other vehicle. Other communication scenarios may also be identified through a suitable identifier such as the media preference information 206a–206n, but not limited to, requiring different voice codec for speech recognition, such as distributed speech recognition when communicating with a specific Internet portal. Another media preference identifier can be associated with using a different type of voice coding protocol when communicating with a different multimodal portal. An additional identifier may be associated with session preference information 212 such as a communication scenario in which a user uses multiple media/modality simultaneously but via different networks, such as where a specific network is identified via other multimodal preference information for voice modality simultaneously while visual information is to be sent through a different multimodal communication apparatus such as a cable set top box. Accordingly, each identifier identifies a different multimodal profile. There may be multiple multimodal profiles for a given user, a software application or multimodal communication apparatus.

As shown in block 306, when identifiers 204a–204n are used, the method includes associating the received input and output modality preference data 200a–200n (and other multimodal preference information if it is chosen by a user) with an identifier 204a–204n through, for example, the use of an object oriented database or other suitable mechanism. Accordingly, the method includes storing the received input and output modality preference data and associating the identifier to at least a pair of received input/output modality preference data. In other words, at least one input modality and at least one output modality are selected for a given identifier. As shown in FIG. 2, one multimodal profile associated with identifier 204a, namely the "in meeting" multimodal profile, requires that the input modality be graphical input and that the output modality preference data 200c also be graphical output. This is selectable by the user through the multimodal user interface 116. In addition, the user may select a format identifier 206a–206n to indicate the format of a particular communication. For example, with the "in meeting" scenario, media preference information 206a may be selected by a user so that all text that is output to the graphical output interface 118 is presented in all capital letters. The session preference information 212 may also include for example, data representing a preferred/default voice gateway, network Quality-of-Service (QoS) parameters, media transport parameters such as RTP for transport of speech, TCP/IP or HTTP for transport of markup language, security information, or any other suitable information. It will also be noted that the ambient threshold information 120 is not necessary if a the multimodal communication apparatus already receives data or already knows, for example, that an "in car" scenario is present.

Referring back to FIG. 3, the method includes as shown in block 308, determining an end of preference data for a given identifier or multimodal profile. This may be done, for example, by monitoring whether or not a particular GUI button has been activated by a user when the user is finished selecting the appropriate multimodal preference information for a given profile. If the user has not finished selecting all of the multimodal preference information for a given identifier, the method includes receiving additional input and output modality preference data or other multimodal preference information.

The identifier 204a–204n may represent an environmental situation associated with a multimodal communication as noted above, such as whether or not the multimodal communication apparatus will be in a meeting with the user, or in a car, or in another environment or it may represent another scenario such as a type of media service or other service.

The communication session preference information 212 (e.g., parameters) may define a preferred/default multimodal gateway to use, speech engine identifier and parameters to use, protocols for communication with such gateways, whether to use a local speech engine or network based speech engine, email address/PIN number for use in a session, e-wallet information, network quality-of-service parameters or other suitable session preference information. As such, the multimodal preference information 202 may include selectable variables based on operational capabilities of at least one of the multimodal communication apparatus capabilities, the communication network capabilities, ambient conditions, or a server that is to be part of the communication session. The media preference information (e.g., media parameters) 206a–206n facilitate control of the format of information sent or received during the multimodal communication. The multimodal preference information 202 may also include ambient condition threshold data 210a–210n. For example, a user may set a certain noise threshold below which voice input may be used as the input modality whereafter if the ambient condition threshold is exceeded, such as if the noise within an automobile is too loud, the input modality may be switched to a text-based input interface using a different profile (see, e.g., FIG. 4). Accordingly, once the multimodal profiles have been created and stored, the multimodal communication apparatus may then operate based on the customized multimodal limitations set forth by the user for a given situation.

Once created, the multimodal profile may be transferred between the multimodal communication apparatus 102 and the multimodal network element 104 via a synchronization technique, as known in the art, so that a copy resides on both the multimodal communication apparatus 102 and the multimodal network element 104. Also, the multimodal profile may be transferred such that only the multimodal network element keeps a copy. Transferring of the multimodal profile allows a user to create or edit the multimodal profile through one unit and have another unit be controlled by the multimodal profile. This can facilitate roaming among devices and also facilitates consistent maintenance of multimodal profiles among differing devices.

Referring back to FIGS. 1 and 2, the multimodal profile generator 110 is operative to access a multimodal profile 114 wherein the multimodal profile 114 contains at least multimodal preference information 202 that is associated with at least one input modality and at least one output modality 200a–200n. The multimodal communication apparatus configuration controller 112 is operatively responsive to accessed multimodal preference information 122 which is obtained from the selected profile based on the received identifier 204 through the user interface after the multimodal profiles have been created. The multimodal communication apparatus configuration controller 112 generates control signals 124 and 126 to configure the multimodal user input interface and the multimodal output interface of the multimodal communication apparatus for a multimodal communication session, which includes, for example, any commands or signal necessary for the multimodal communication apparatus to carry out the setting up of the multimodal profile. For example, if a user selected a GUI button entitled "in car" (see FIG. 2) or said "in car", the "in car" profile is accessed by the multimodal communication apparatus configuration controller 112. In this scenario, as shown in FIG. 2, for example, the "in car" profile selects the input modality to be voice input and the output modality to also be a voice output so that a user may merely speak into the multimodal communication apparatus 102 and receive a response also in a voice output. As also shown, the format ID for the voice output is in a PCM protocol In addition, in this example, the multimodal communication apparatus also includes an ambient condition sensor 120. As such, the ambient condition threshold data 210 is also included as part of the multimodal profile.

To configure the multimodal communication apparatus 102 for a multimodal communication session, the multimodal communication apparatus configuration controller 112 uses a received identifier to select one of the plurality of stored multimodal preferences from a selected multimodal profile.

The multimodal communication apparatus configuration controller 112 may also send via wireless link 102, setup information for the multimodal network element 104 to facilitate a multimodal communication session based on the multimodal preference information 202. For example, the session preference information 212 may define and control a specified protocol to the user, identifier or network based multimodal gateway, QOS parameters, other transport protocols such as RTP, HTTP, TCP/IP, UDP/IP, etc. These parameters may be selected as part of multimodal preference information 202 as noted above to create a network specific profile for a given session, if desired.

The multimodal profile generator 110 stores a plurality of multimodal preferences in the memory 114 in the form of, for example, a database for a plurality of different multimodalities to create a multimodal profile on a per user, per device or per application basis as desired. As such, an additional field for multimodal preference information may include a user ID, device ID, or software application ID.

Figure 4:
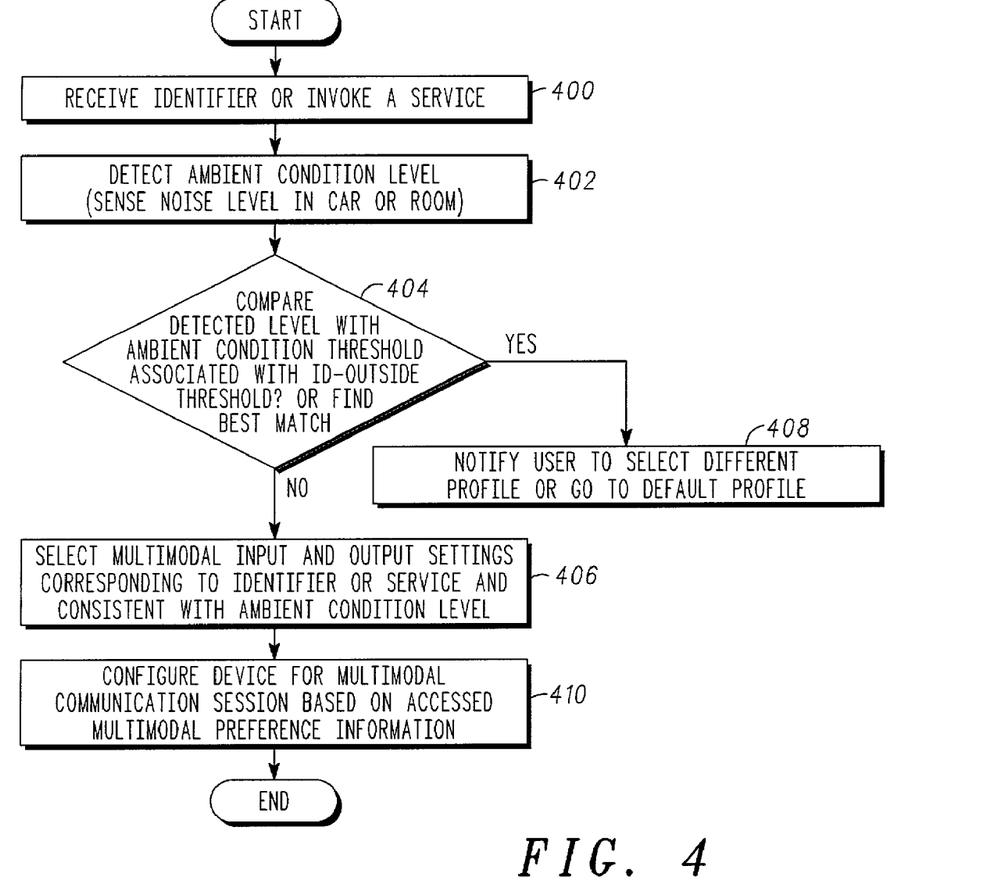
FIG. 4 is a flow chart illustrating one example of a multimodal communication method in accordance with one embodiment of the invention.

FIG. 4 illustrates a multimodal communication method that involves accessing or using a multimodal profile. As shown in block 400, the method includes receiving an identifier 204 via the multimodal input user interface 116. The identifier 204 may also identify, for example, a specific type of service. Accordingly, a service identifier may be used wherein the user interface may have a service icon, for example, an Internet service that when the icon is activated a specific multimodal profile is then accessed. Hence the invoking of a service may in fact cause the sending of the identifier so that the multimodal communication apparatus configuration controller 112 can access the suitable multimodal profile. The multimodal communication apparatus configuration controller 112 retrieves the best matching or default profile that matches a given profile identifier (e.g., 204a–204n) or a set of criteria described by the multimodal preference information 202. As such, no profile identifier 204a–204n need be used when the multimodal communication apparatus configuration controller 112 receives desired multimodal preference information 202 from, for example, the multimodal user input interface 116 or other source and selects a stored profile that most closely matches the desired settings.

As shown in block 402, the method includes detecting, such as by the ambient condition sensor 120 when present, an ambient condition level and generating an ambient condition level signal 122 which is evaluated by the multimodal communication apparatus configuration controller 112. this is optional and is carried out if an ambient condition sensor is used. In such an embodiment, the method includes comparing, such as by the multimodal communication apparatus configuration controller 112 or any other suitable mechanism, the ambient condition level 122 to the ambient condition threshold data 210a associated with the accessed multimodal profile. This is shown in block 404. As shown in block 406, the method includes selecting a multimodal input and output setting defined by the multimodal preference data in the accessed profile which sets the input/output modality for the multimodal communication apparatus based on the comparison of the ambient condition threshold with the actual ambient condition level 122. This occurs if the detected ambient level is within the ambient condition threshold. However, if it is outside of the threshold indicating that, for example, the noise level in a room or vehicle is too loud to accommodate voice output, the method includes notifying a user to select a different profile or the multimodal apparatus configuration controller 112 uses a default profile. In any embodiment, a default profile or a best matching profile can be used. Also, the user can be presented with a filtered list of one or more matching profiles, if desired. This is shown in block 408. If, however, the detected ambient level is within the threshold setting, the method includes, as shown in block 410, configuring the multimodal communication apparatus 102 for the multimodal communication session based on the access multimodal preference information by generating control signals 124 and 126 to select the appropriate input/output modality for the interfaces 116 and 118 and also notifying the multimodal network element 104 to set up the appropriate formats, or to communicate with any other processes necessary to carry out the identified variables in the multimodal profiles. It will be recognized that an opposite approach regarding the threshold may also be employed.

Hence as noted above, to access a multimodal profile, a user selects a multimodal profile by the identifier, a set of criteria, which are then matched against the criteria in the profile 114 to select the best matching profiles, from which the user may select his/her preference. Also, the profile may be selected automatically, e.g., the user can set a flag to indicate that always or for some cases the system must choose the profile, in which case the system, browser or application automatically selects a profile or invokes a service that accesses a multimodal profile. Any ambient conditions or other filtering or restricting criteria are obtained from the profile. Filtering criteria may be obtained by or from a third party, if desired. A comparison is made to determine whether filtering or customizing criteria such as ambient conditions are met and an appropriate profile is selected. For example, if the ambient condition threshold is exceeded, a different profile is selected. It will also be recognized that users may add, remove or modify the profiles as desired. Accordingly, the above apparatus and method facilitates customizing multimodal preferences for various situations. Specifying modality preferences for each session is eliminated. Other advantages will be recognized by those having skill in the art.

It should be understood that the implementation of other variations and modifications of the invention in its various aspects will be apparent to those of ordinary skill in the art, and that the invention is not limited by the specific embodiments described. For example, the multimodal profile generator and the multimodal configuration controller may be programmed to carry out each other's functions. It is therefore contemplated to cover by the present invention, any and all modifications, variations, or equivalents that fall within the spirit and scope of the basic underlying principles disclosed and claimed herein.

What is claimed is:

1. A multimodal communication method comprising:
    accessing a multimodal profile that contains at least multimodal preference information associated with at least one input modality and at least one output modality and at least one of: an identifier associated with the multimodal preference information and multimodal preference information;
    configuring at least one multimodal communication apparatus for a multimodal communication session based on the accessed multimodal preference information;
    detecting an ambient condition level associated with the multimodal communication apparatus,
    comparing the ambient condition level to ambient condition threshold data; and
    selecting a multimodal input and output modality for the multimodal communication apparatus based on the comparison.

2. The method of claim 1 wherein configuring the at least one multimodal communication apparatus for the multimodal communication session based on the accessed multimodal preference information includes using the at least one identifier to select one of a plurality of stored multimodal preferences from a multimodal profile.

3. The method of claim 2 including configuring at least one multimodal server for a multimodal communication session based on the selected multimodal preference information.

4. The method of claim 1 including storing a plurality of multimodal preferences for a plurality of different modalities to create a multimodal profile.

5. The method of claim 1 including:
    creating at least one multimodal profile by:
        presenting a user interface that receives input and output modality preference data to define differing multimodal preference information for a plurality of multimodal communication scenarios associated with a plurality of identifiers; and
        storing received input and output modality preference data and associating an identifier to at least a pair of received input and output modality preference data.

6. The method of claim 1 wherein the identifier associated with the multimodal preference information represents an environmental situation associated with a multimodal communication.

7. The method of claim 1 wherein the multimodal preference information includes ambient condition threshold data associated with at least one identifier.

8. The method of claim 5 wherein the multimodal preference information includes at least one of: session preference information, media preference information including format identifiers to facilitate control of a format of information sent or received during the multimodal communication, and input output modality preference data.

9. The method of claim 1 wherein available multimodal preference information is based on operational capabilities of at least one of: multimodal communication apparatus capabilities, communication network capabilities, ambient conditions, a server that is accessed by the multimodal communication apparatus and a service accessed by the multimodal communication apparatus.

10. The multimodal communication method of claim 1 wherein selecting the multimodal input and output modality for the multimodal communication apparatus in response to the comparison includes selecting an input modality to be provided by an input interface and an output modality to be provided by an output interface.

11. A multimodal communication apparatus comprising:
    a multimodal profile generator operative to access a multimodal profile that contains at least one of multimodal preference information associated with at least one input modality and at least one output modality and at least one of: an identifier associated with the multimodal preference information and multimodal preference information;
    a multimodal communication apparatus configuration controller, operatively responsive to the accessed multimodal preference information, to configure a multimodal communication apparatus for a multimodal communication session based on the accessed multimodal preference information to detect an ambient condition level associated with the multimodal communication apparatus;
    compare the ambient condition level to ambient condition threshold data; and
    select a multimodal input and output modality for the multimodal communication apparatus based on the comparison.

12. The multimodal communication apparatus of claim 11 including:
    a user interface, operatively coupled to the multimodal profile generator, that receives input and output modality preference data to define differing multimodal preference information for a plurality of multimodal communication scenarios associated with a plurality of identifiers; and
    memory, operatively coupled to the multimodal profile generator, that stores received input and output modality preference data and an associated identifier that has been associated with at least a pair of received input and output modality preference data, as part of the multimodal profile.

13. The multimodal communication apparatus of claim 12 wherein the multimodal communication apparatus configuration controller configures the multimodal communication apparatus for the multimodal communication session based on the accessed multimodal preference information using the at least one identifier to select one of a plurality of stored multimodal preferences from the multimodal profile.

14. A multimodal communication system comprising:
    (a) a multimodal communication apparatus having:

a multimodal profile generator operative to access a multimodal profile that contains at least one of multimodal preference information associated with at least one input modality and at least one output modality and at least one of: an identifier associated with the multimodal preference information and multimodal preference information;

a multimodal communication apparatus configuration controller, operatively responsive to the accessed multimodal preference information, to configure a multimodal communication apparatus for a multimodal communication session based on the accessed multimodal preference information, detect an ambient condition level associated with the multimodal communication apparatus;

compare the ambient condition level to ambient condition threshold data;

select a multimodal input and output modality for the multimodal communication apparatus based on the comparison; and (b) a multimodal network element, operatively coupled to the multimodal communication apparatus, to provide information during a session with the multimodal communication apparatus.

15. The multimodal communication system of claim 14 including memory, operatively coupled to the multimodal communication apparatus, the memory containing received input and output modality preference data and an associated identifier that has been associated with at least a pair of received input and output modality preference data, as part of the multimodal profile.

16. The multimodal communication system of claim 15 including memory, operatively coupled to the multimodal network element, the memory containing received input and output modality preference data and an associated identifier that has been associated with at least a pair of received input and output modality preference data, as part of the multimodal profile.

17. The multimodal communication system of claim 15 wherein the multimodal communication apparatus includes a user interface, operatively coupled to the multimodal profile generator, that receives input and output modality preference data to define differing multimodal preference information for a plurality of multimodal communication scenarios associated with a plurality of identifiers.

18. The multimodal communication system of claim 14 wherein the multimodal profile is transferred between the multimodal communication apparatus and the multimodal network element.

* * * * *